United States Patent
Chen et al.

(10) Patent No.: US 8,052,415 B2
(45) Date of Patent: Nov. 8, 2011

(54) MOLD HAVING A COAXIAL COOLING AND HEATING COIL STRUCTURE

(75) Inventors: Shia-Chung Chen, Taoyuan County (TW); Jen-An Chang, Taoyuan County (TW)

(73) Assignee: Chung Yuan Christian University, Taoyuan County (TW)

(*) Notice: Subject to any disclaimer, the term of this patent is extended or adjusted under 35 U.S.C. 154(b) by 58 days.

(21) Appl. No.: 12/641,973

(22) Filed: Dec. 18, 2009

(65) Prior Publication Data

US 2010/0159061 A1    Jun. 24, 2010

(30) Foreign Application Priority Data

Dec. 19, 2008   (TW) ............................... 97149664 A

(51) Int. Cl.
*B29C 45/73* (2006.01)
(52) U.S. Cl. .................. 425/547; 425/548; 425/552
(58) Field of Classification Search .............. 425/547, 425/548, 552; 165/58, 61, 65
See application file for complete search history.

(56) References Cited

U.S. PATENT DOCUMENTS

| 5,055,025 A | * | 10/1991 | Muller | 425/144 |
| 5,423,670 A | * | 6/1995 | Hamel | 425/144 |

FOREIGN PATENT DOCUMENTS

| TW | 92123775 | 12/2004 |
| TW | 92123778 | 3/2005 |
| TW | 94127663 | 2/2007 |

* cited by examiner

*Primary Examiner* — Timothy Heitbrink
(74) *Attorney, Agent, or Firm* — WPAT, PC; Justin King

(57) ABSTRACT

The present invention relates to a coaxial cooling/heating coil structure and a mold configured with the same, in which the coaxial cooling/heating coil is comprised of: a frame, configured with a cooling channel having an inlet, provided for a cooling water to flow therein, and an outlet, provided for discharging the cooling water therefrom; and a heat-conducting coil, disposed inside the cooling channel. The coaxial cooling/heating structure is fitted to a mold to be used for enhancing the preheating efficiency of the mold while improving the time required for cooling the mold.

27 Claims, 6 Drawing Sheets

MOLD HAVING A COAXIAL COOLING AND HEATING COIL STRUCTURE

FIELD OF THE INVENTION

The present invention relates to a coaxial cooling/heating coil structure and a mold configured with the same, and more particularly, to a high-frequency heating coil structure having a heat-conducting coil coaxially disposed inside its cooling channel.

BACKGROUND OF THE INVENTION

In the operation of injection molding process, it is common to preheat the female die and male die to a specific temperature before the two dies are integrated for injection since the preheated mold can prevent the melted plastic from cooling down too rapidly and becoming somewhat "sticky" and thus ensure the melted plastic that is being injected into the same through its sprue gate, to flow smoothly therein and arrive at the mold cavity for molding.

It is noted that the conventional preheating structures for injection molds, which can be electric heaters or high-frequency heater, are fixed heaters being fitted inside either the female die or the male die of the injection molds. As a conventional high-frequency mold structure shown in FIG. 1, the male die 11 and female die 12 are configured with inserts 13, 14 in respective while there is an electric heating coil 16 and cooling pipe 17 being configured inside the male die 11 and a sprue gate 15 for the mold structure being formed on the female die 12. The electric heating coil 16 is activated for preheating the male die 11 before the two dies 11, 12 are integrated and clamped, and then the two dies 11, 12 can be integrated and provided for a melted plastic to be filled therein through the sprue gate 15, by that since the preheating can prevent the melted plastic from cooling down too rapidly, the melted plastic is able to solidified and molded correctly inside the mold structure, and thereafter being cooled down by the cooling pipe 17 for preparing the final product of the injection molding to be detached from the mold structure.

Nevertheless, the aforesaid conventional mold structure is shorted in the sizes of its male die and female die as they can be very big and bulky. As a larger die will required a longer time for preheating the same to a specific temperature, the production time for an injection molding process using the mold to produce a product is prolonged and consequently the production yield of the injection molding is adversely affected. Not to mention that the lager a die is, the more energy it will need for the preheating which not only is not energy efficient, but also can be very costly. Moreover, as there is cooling water kept circulating inside the cooling pipe even at the time when the electric heating coil is activated for preheating the male die or female die, the male die or female die is being cooling down as it is being heated which not only might prevent the same from being heated to the specific temperature, but also can waste a lot of energy.

Except for the aforesaid internal heater embedded inside the die, there are external preheating structures for preheating the mold, as the heater 20 shown in FIG. 2. The heater of FIG. 2 is composed of a burner 21 and a fuel pipe 22, in which as the fuel pipe 22 is connected to the burner 21 by an end thereof while another end of the fuel pipe 22 is connected to a fuel supply, fuel can be fed to the burner 21. As shown in FIG. 2, the flame 23 from the burner 21 of the external heater 20 is adapted for heating a forging mold for forging machines or an injection mold for injection molding as the molds are composed of a top die 24 and a bottom die 25 and thus the temperatures of the heated molds can be increased from room temperature to a working temperature. Nevertheless, although the aforesaid external heater is able to achieve the expected preheating effect, it can be very time-consuming and difficult to apply that it is only suitable for large-size forging machines or injection molds, and is not adapted for molds of precision injection molding.

In addition, there is a conventional preheating structure that is configured with a hollow heating coil whereas the hollow heating coil is structured for allowing cooling water to flow inside the hollow coil. However, as the cooling water is flowing inside the heating coil, the cooling water is not able to cool down the corresponding mold effectively and thus the heat dissipating efficiency of the mold is poor. If a better cooling effect is required, it is required to increase the inner diameter of the heating coil for increasing the flow of the cooling water, but at the cost of larger and heavier heating coil.

There are already many heating devices for mold preheating, as those disclosed in TW Pat. Appl. No. 92123778, TW Pat. Appl. No. 92123775 and TW Pat. Appl. No. 94127663. In the driving device for instant mold preheating module disclosed in TW Pat. Appl. No. 92123778, the inserts in a mold will first be identified and driven by the driving device for enabling the same to be preheated during the clamping process for die integration, As the volumes of the inserts are usually comparatively smaller, they can be heated to a specific temperature rather fast. Moreover, also as the inserts are small in size, they can be cooled down equally fast after the melted plastic had filled uniformly in the mold cavity and after mold injection. As the instant mold preheating module in the aforesaid TW patent is a high-frequency induction heating device packed inside ceramics or plastic steel, which can be fitted inside grooves formed on the inserts for using the eddy currents from the heating device to heat up the inserts to a specific temperature in an instant manner. Thereby, not only the time required for preheating the mold is decreased, but also the preheating efficiency of the mold is improved. On the other hand, the instant heating method and device of molding equipment disclosed in TW Pat. Appl. No. 92123775 is an improvement over that disclosed in TW Pat. Appl. No. 92123778. In TW Pat. Appl. No. 92123775, the high-frequency induction heating energy is designed to work directly on the inserts of a mold for heating the surfaces of the same to a specific temperature in an instant manner, by that not only the preheating efficiency is improved with less energy consumption, but also it can ensure the melted plastic to flow smoothly in the mold cavity for molding. Furthermore, the device disclosed in TW Pat. Appl. No. 94127663 is further an improvement over the one disclosed in TW Pat. Appl. No. 92123775. In the TW Pat. Appl. No. 94127663, the connection between the heating coil and the transformer is redesigned and structured for enabling the two to be detachable, so that the preheating device can be move easily and rapidly around a mold so as to be used for preheating any portion of the mold in a precise manner.

However, those prior-art preheating devices are only aimed for the improvement in preheating efficiency. Thus, it is in need of a preheating device capable of fitted to a mold to be used for enhancing the preheating efficiency of the mold while reducing the time required for cooling the mold.

SUMMARY OF THE INVENTION

In view of the disadvantages of prior art, the object of the present invention is to provide a coaxial cooling/heating coil structure and a mold configured with the same, capable of enhancing the preheating efficiency of the mold while reducing the time required for cooling the mold as the coaxial cooling/heating coil structure is configured with a heat-conducting coil being coaxially disposed inside its cooling channel.

To achieve the above object, the present invention provides a coaxial cooling/heating coil structure and a mold configured with the same, in which the coaxial cooling/heating coil is comprised of: a frame, configured with a cooling channel having an inlet, provided for a cooling water to flow therein, and an outlet, provided for discharging the cooling water therefrom; and a heat-conducting coil, disposed inside the cooling channel.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 2:
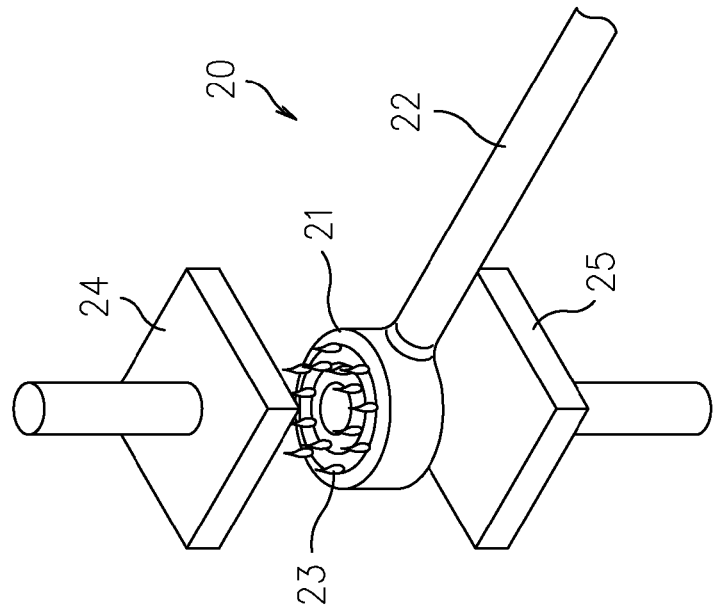
FIG. 2 is a schematic diagram showing a conventional preheating structure.
Figure 1:
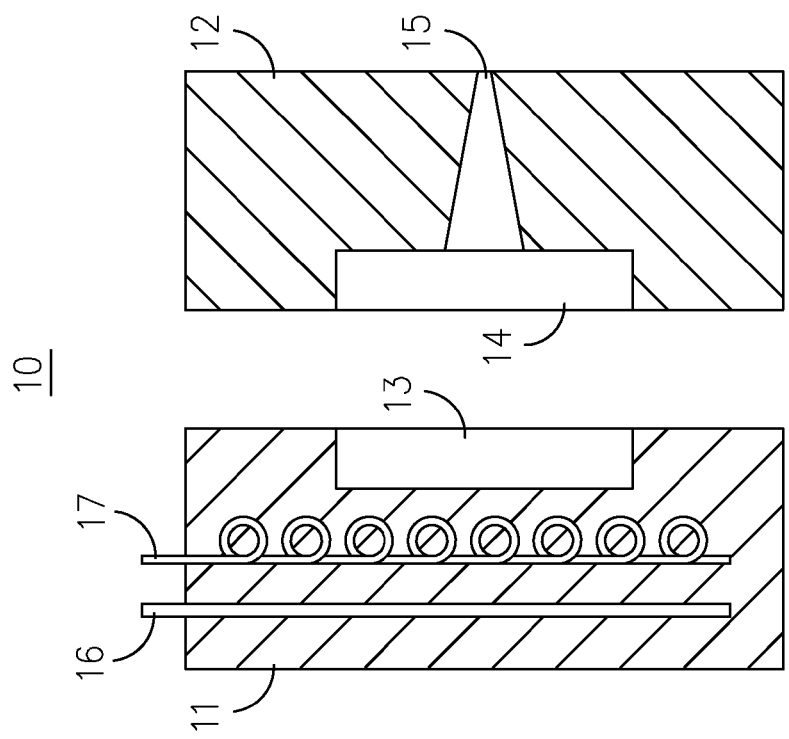
FIG. 1 is a schematic diagram showing a conventional high-frequency mold structure.
Figure 3:
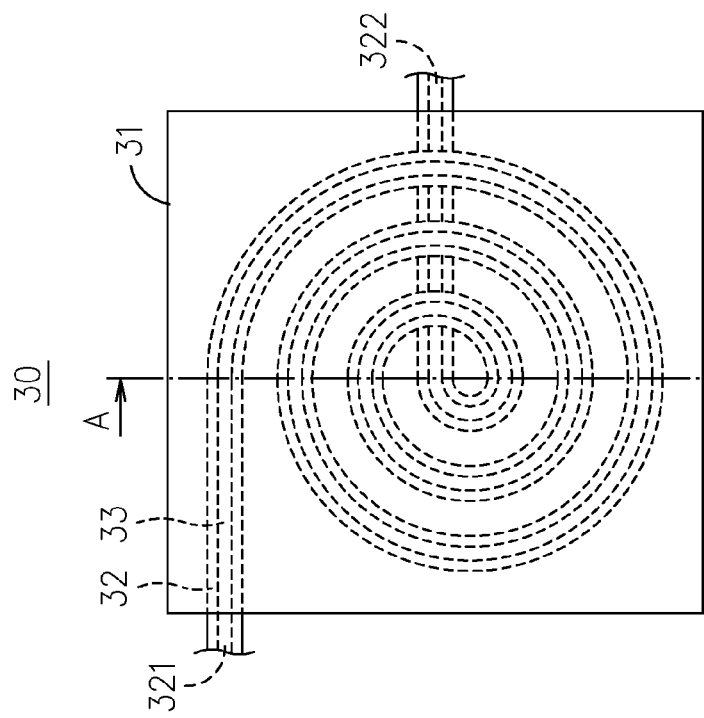
FIG. 3 is a front view of a coaxial cooling/heating coil structure according to a first embodiment of the invention.
Figure 4:
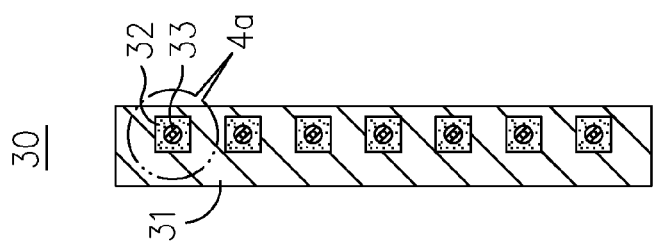
FIG. 4 is an A-A cross sectional view of FIG. 3.
Figure 4A:
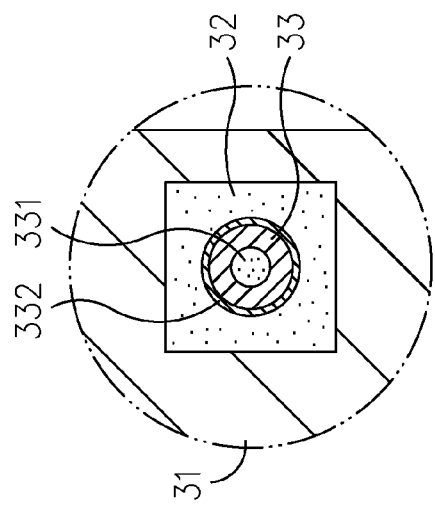
FIG. 4A is an enlarged view showing a portion of FIG. 4.

Please refer to FIG. 3 to FIG. 4A, which show a coaxial cooling/heating coil structure according to a first embodiment of the invention. The coaxial cooling/heating coil structure 30 in this embodiment comprises: a frame 31; a cooling channel 32, arranged at the frame 31 and configured with an inlet 321, provided for a cooling water to flow therein, and an outlet 322, provided for discharging the cooling water therefrom; and a heat-conducting coil 33, disposed inside the cooling channel 32 and capable of being activated for heating by an high-frequency induction manner. As shown in FIG. 4A, the heat-conducting coil 331 is a hollow tube with an internal cooling channel 331 formed therein. The internal cooling channel 331 is configured the same as that of the cooling channel 32 as it is also formed with an inlet and outlet and is filled with circulating cooling water. Thereby, the heat-conducting coil 33 is substantially being enclosed and surrounded by cooling water as there are cooling channels formed inside and outside of the heat-conducting coil 33. It is noted that the internal cooling channel 331 is functioned for preventing the heat-conducting coil 33 from overheating so that the cooling water in the internal cooling channel 331 is kept flowing and circulating. However, since the cooling channel 32 is designed for cooling down the frame 31 and the heat-conducting coil 33 rapidly, the cooling channel 32 is drained or is being filled with static cooling water when the heat-conducting coil 33 is being activated for heating; and the cooling channel 32 is only being filled with circulating cooling water when the heat-conducting coil 33 is stopped from heating. In addition, for preventing electric leakage from being caused by any contact between the heat-conducting coil 33 and the cooling water in the cooling channel 32, the heat-conducting coil 33 is being wrapped inside an insulating layer 332. It is noted that there is no restriction regarding to the material and the thickness of the insulating layer 332, they can be determined according to actual requirements.

Figure 5:
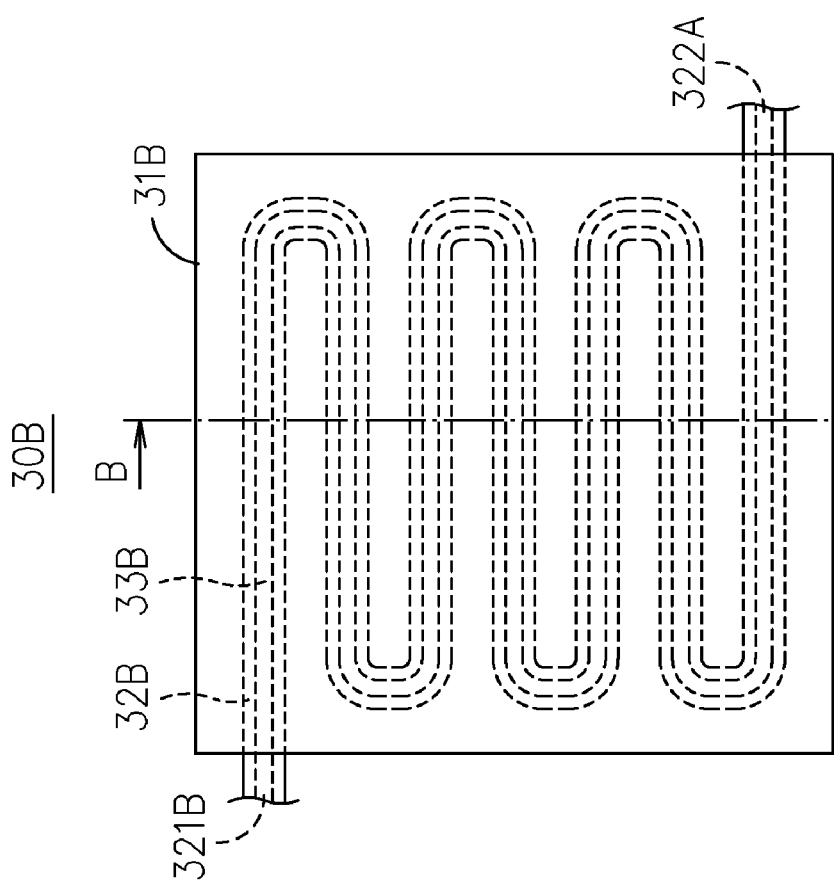
FIG. 5 is a front view of a coaxial cooling/heating coil structure according to a second embodiment of the invention.

Please refer to FIG. 5, which show a coaxial cooling/heating coil structure according to a second embodiment of the invention. Similarly, the coaxial cooling/heating coil structure 30B in this embodiment comprises: a frame 31B; a cooling channel 32B, arranged at the frame 31B and configured with an inlet 321B, provided for a cooling water to flow therein, and an outlet 322B, provided for discharging the cooling water therefrom; and a heat-conducting coil 33B, disposed inside the cooling channel 32B and capable of being activated for heating by an high-frequency induction manner. The difference between the present embodiment with the one shown in FIG. 3 is that: the cooling channel 32 is formed in a shape like a spiral, but the cooling channel 32B of the present embodiment is disposed in a manner that it is zigzagging on a two-dimensional plane. It is noted from the B-B cross section of FIG. 5, that the coaxial cooling/heating coil structure of the second embodiment is structured similar to that of the first embodiment.

Figure 6:
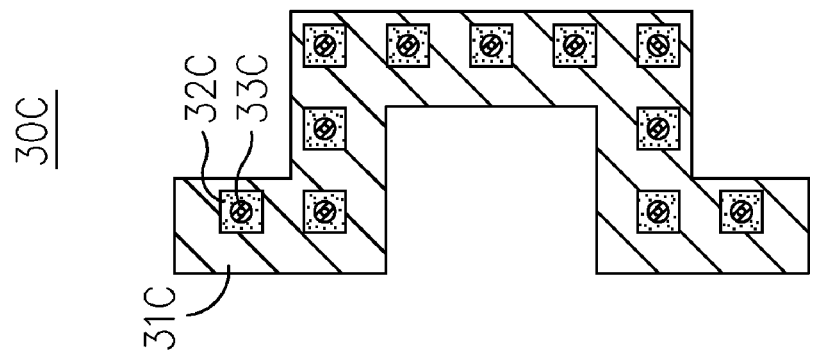
FIG. 6 is a front view of a coaxial cooling/heating coil structure according to a third embodiment of the invention.

From the above description, it is noted that there can be a variety of coaxial cooling/heating coil structures only if it is structured with a cooling channel which has a heat-conducting coil coaxially disposed therein. It is noted that there is no specific restriction being applied to the type of the cooling channel capable of being used in the coaxial cooling/heating coil structures of the invention. Taking the one shown in FIG. 6 for instance, as the frame 31C in this embodiment is in an irregular shape, the cooling channel 32C with the heat-conducting coil 33C that is formed inside the frame 31C is disposed following the irregularity of the frame 31C and is being disposed in a three-dimensional space in a manner that different portions of the cooling channel 32C are extending in the space at different heights. In addition, the cooling channel can be formed according to actual requirements that it can be formed in a spiral wrapping around a concave cone, a spiral wrapping around a convex cone, or other regular/irregular shapes, and so on.

Figure 8:
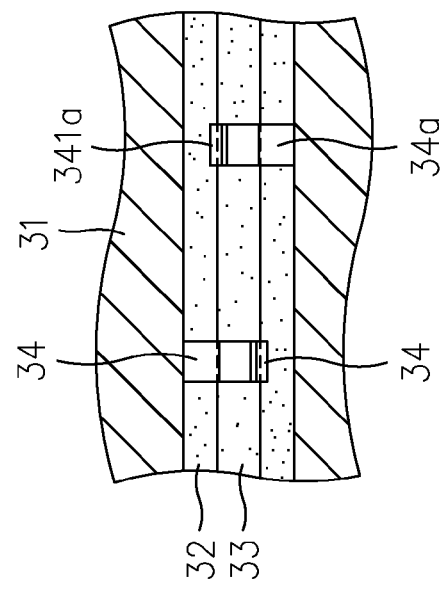
FIG. 8 is a C-C cross sectional view of FIG. 7.
Figure 7:
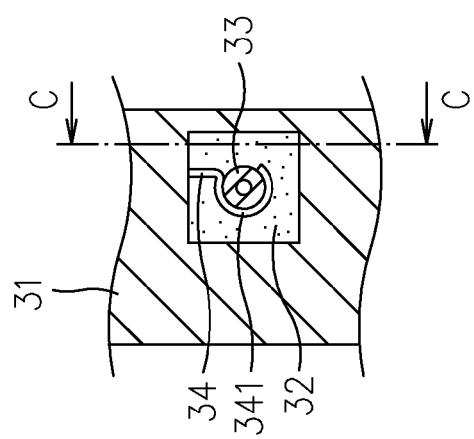
FIG. 7 is a cross section diagram showing a supporting structure for supporting a heat-conducting coil in a coaxial cooling/heating coil structure of the invention.

Please refer to FIG. 7, which is a cross section diagram showing a supporting structure for supporting a heat-conducting coil in a coaxial cooling/heating coil structure of the invention. Since the heat-conducting coil 33 is disposed inside the cooling channel 32, ideally the heat-conducting coil 33 should be disposed in a way that there should be no physical contact between the heat-conducting coil 33 and the inner wall of the cooling channel 32. Thus, it is required to have a supporting structure which is disposed inside the cooling channel 32 and used for supporting the heat-conducting coil 33 in a manner that the heat-conducting coil 33 is hung inside the cooling channel 32. As shown in FIG. 7, the supporting structure is composed of at least one supporting arm. Taking the one supporting arm 34 shown in FIG. 7 for instance, it is disposed extending out of the inner wall of the cooling channel 32 and toward the center thereof. Moreover, the supporting arm 34 is configured with a hook 341 to be used for clasping the heat-conducting coil 33 so that the heat-conducting coil is supported by the supporting arm 34 and thus hung inside the cooling channel 32 without causing any contact between the two. As the a C-C cross sectional view of FIG. 7 that is shown in FIG. 8, there can be more than one such supporting arms 34 being disposed inside the cooling channel 32 in an alternating manner while extending toward the center of the cooling channel 32 in arbitrary direction, as the two supporting arms 34, 34a shown in FIG. 8, while each supporting arm 34 will clasp the heat-conducting coil 33 by its hook, as the two hooks 341, 341a, so as to hang the heat-conducting coil 33 inside the cooling channel 32 without causing any contact between the two.

Figure 9:
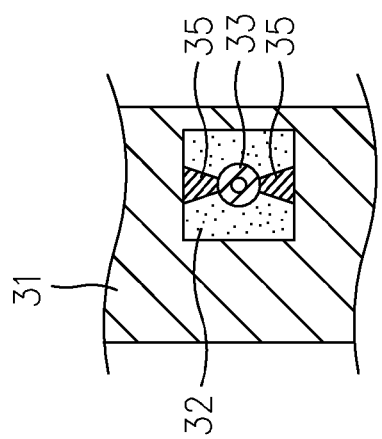
FIG. 9 is a cross section diagram showing another supporting structure for supporting a heat-conducting coil in a coaxial cooling/heating coil structure of the invention.

Please refer to FIG. 9, which is a cross section diagram showing another supporting structure for supporting a heat-conducting coil in a coaxial cooling/heating coil structure of the invention. In FIG. 9, the supporting structure is composed of a plurality of brackets 35 that are disposed for firmly clamping the heat-conducting coil 33 in the spaces enclosed between the tops thereof so that the heat-conducting coil 33 can be hung inside the cooling channel 32 without causing any contact between the two. The amount of the bracket 35 is not limited to a specific number. Basically, one bracket 35 might be sufficient to support and hang the heat-conducting coil 33. However, for preventing the heat-conducting coil 33 from being displaced by any movement of the frame 31, it is preferred to dispose the plural brackets 35 in pairs while enabling each pair of brackets 35 to be disposed in the cooling channel 32 at positions symmetrical to each other, as the two shown in FIG. 9, so that the heat-conducting coil 33 is firmed sandwiched between the gap formed between the top of the paired brackets 35.

Figure 11:
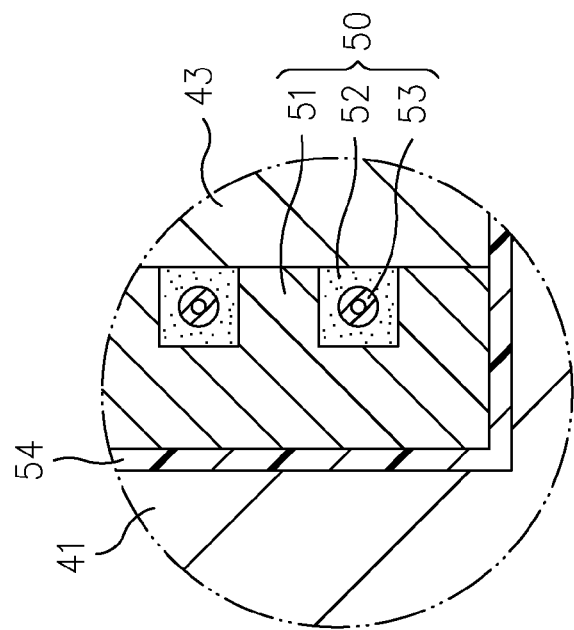
FIG. 11 is an enlarged view showing the D portion of FIG. 10.
Figure 10:
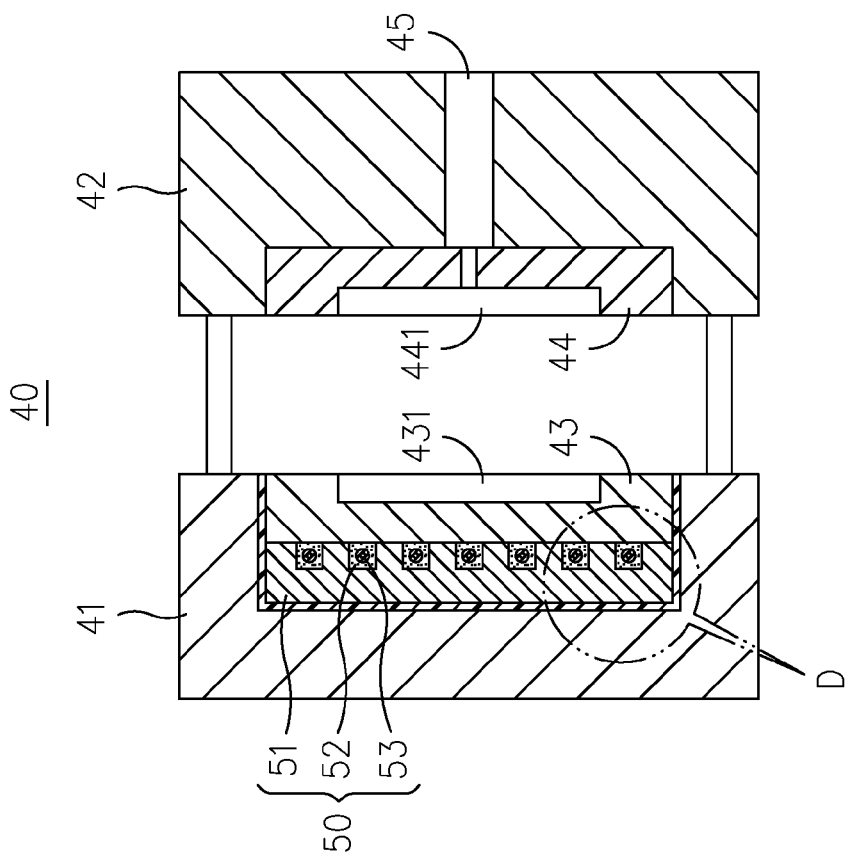
FIG. 10 is a schematic diagram showing a high-frequency mold using a coaxial cooling/heating coil structure according to an embodiment of the invention.

Please refer to FIG. 10, which is a schematic diagram showing a high-frequency mold using a coaxial cooling/heating coil structure according to an embodiment of the invention. The high-frequency mold 40 of FIG. 10 is composed of a male die 41 and a female die 42, in which the male die 41 is configured with an insert 43 and the female die 42 is also configured with an insert 44. As shown in FIG. 10, the inserts 43, 44 are formed respectively with mold cavities 431, 441, and there is a coaxial cooling/heating coil structure 50 being configured at a side of the mold corresponding to the male die 41 and a sprue gate 45 being formed on the female die 42. The coaxial cooling/heating coil structure 50 comprises: a frame 51; a cooling channel 52, arranged at the frame 51; and a heat-conducting coil 53, coaxially disposed inside the cooling channel 52. Moreover, the coaxial cooling/heating coil structure 50 is arranged abutting against the insert 43 of the male die 41 so that the cooling channel 52 is formed by the enclosure of the frame 51 and the insert 43. In addition, there is a heat-insulating layer 54 disposed between the male die 41, the coaxial cooling/heating coil structure 50 and the insert 43. As the enlarged diagram shown in FIG. 11, the heat-insulating layer 54 is disposed for preventing the heat of the heat-conducting coil 53 from being conducted directed to the bulky male die 41 and thus preventing any unnecessary heat loss from happening. As for the material and the thickness of the heat-insulating layer 54 are determined dependent upon actual requirements regarding the size of the mold and the product of the mold, etc., which can be any material and of any thickness only if it can have good high-temperature resistance and heat insulation performance. In addition, for improving the heat conductivities of the coaxial cooling/heating coil structure 50 and the insert 43, the frame 51 is designed to be integrally formed with the insert 43 so that the heat from the heat-conducting coil 53 can be transferred directly to the insert 43 while the cooling channel 53 is able to work directly to the insert 43 for cooling the same.

Figure 12:
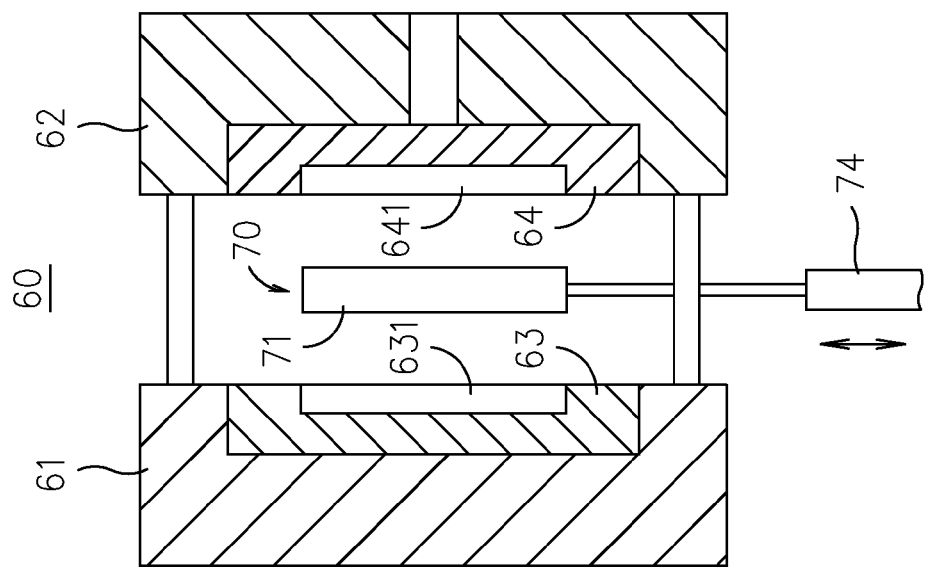
FIG. 12 is a schematic diagram showing another high-frequency mold using a coaxial cooling/heating coil structure according to an embodiment of the invention.

Please refer to FIG. 12, which is a schematic diagram showing another high-frequency mold using a coaxial cooling/heating coil structure according to an embodiment of the invention. The high-frequency mold 60 of FIG. 12 is composed of a male die 61 and a female die 62, in which the male die 61 is configured with an insert 63 and the female die 62 is also configured with an insert 64. As shown in FIG. 12, the inserts 63, 64 are formed respectively with mold cavities 631, 641, and there is a coaxial cooling/heating coil structure 70 being configured at a position between the male die 41 and the female die 62. Similarly, the coaxial cooling/heating coil structure 70 comprises: a frame 57; a cooling channel, arranged at the frame 71; and a heat-conducting coil, coaxially disposed inside the cooling channel. The present embodiment is characterized in that: the frame 71 is mounted on a mobile arm 74 for enabling the same to be moved along with the movement of the mobile arm 74. That is, the mobile arm 74 is able to place the frame 71 into a space between the male die 61 and the female die 62, or pull the frame 71 out of the space between the male die 61 and the female die 62, depending on whether it is intended to preheat the mold cavities 631, 641 or is intended for the mold cavities 631, 641 to cool down.

Figure 13:
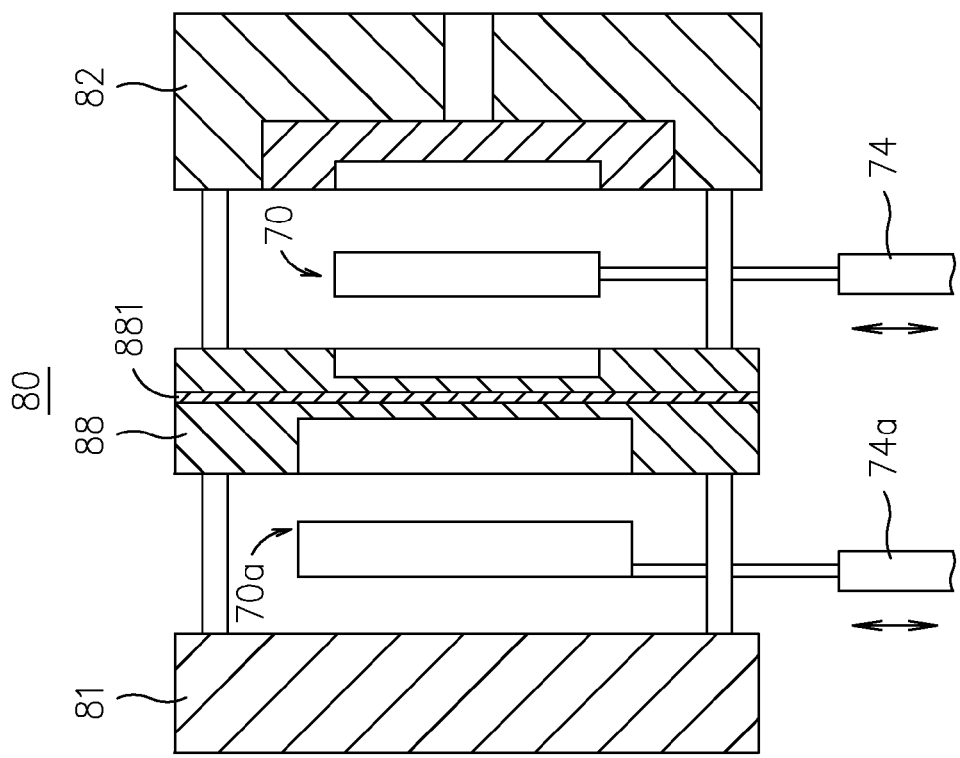
FIG. 13 is a schematic diagram showing yet another high-frequency mold using a coaxial cooling/heating coil structure according to an embodiment of the invention.

Please refer to FIG. 13, which is a schematic diagram showing yet another high-frequency mold using a coaxial cooling/heating coil structure according to an embodiment of the invention. The high-frequency mold 80 of FIG. 13 is composed of three dies, which are a male die 81, a female die 82 and a sub-die 88. As shown in FIG. 13, there are two coaxial cooling/heating coil structures 70, 70a being arranged respectively at positions between the male die 81 and the sub-die 88, and between the female die 82 and the sub-die 88, whereas the two coaxial cooling/heating coil structures 70, 70a are mounted respectively on their corresponding mobile arms 74, 74a. Accordingly, the mobile arms 74, 74a are able to place their corresponding coaxial cooling/heating coil structures 70, 70a into their corresponding spaces between sub-die 88 and the male die 81, and between the sub-die 88 and the female die 82. It is noted that by the aforesaid structure, molds of various configurations can be preheated by the high frequency electromagnetic induction waves emitted from the two coaxial cooling/heating coil structures 70, 70a. However, while applying the aforesaid structure, it is important to have a magnetic insulating layer 881 formed inside the sub-die 88 to be used for preventing magnetic flux of the two coaxial cooling/heating coil structures 70, 70a from repelling or attracting as such repelling or attracting can easily interfere the operation of the two mobile arms 74, 74a and thus cause the mobile arms 74, 74a to work erroneously.

To sum up, the coaxial cooling/heating coil structure and the mold configured with the same provided in the present invention not only can enhance the preheating efficiency of the mold as the coaxial cooling/heating coil structure is able to preheat the mold rapidly and uniformly with less energy consumption, but also it can reduce the time required for cooling the mold as well.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A coaxial cooling/heating coil structure comprising:
   a frame;
   a cooling channel, arranged in the frame and configured with an inlet, and provided with cooling water to flow therein, and an outlet, provided for discharging the cooling water therefrom; and
   a heat-conducting coil, disposed inside the cooling channel.

2. The coaxial cooling/heating coil structure of claim 1, further comprises:
   a supporting structure, disposed inside the cooling channel for supporting the heat-conducting coil in a manner that the heat-conducting coil is attached inside the cooling channel without causing any contact between the cooling channel and the heat-conducting coil.

3. The coaxial cooling/heating coil structure of claim 2, wherein the supporting structure comprises at least one supporting arm, extending from the inner wall of the cooling channel and configured with a hook for clasping the heat-conducting coil so that the heat-conducting coil is positioned inside the cooling channel without causing any contact between the inner wall of the cooling channel and the heat-conducting coil.

4. The coaxial cooling/heating coil structure of claim 2, wherein the supporting structure is composed of at least one bracket, disposed at the bottom of the cooling channel to be provided for the heat-conducting coil to be mount thereon so that the heat-conducting coil is secured and spaced inside the cooling channel, causing no contact to be made between the inner wall of the cooling channel and the heat-conducting coil.

5. The coaxial cooling/heating coil structure of claim 1, wherein the frame is mounted on a mobile arm, enabling the same to be moved along with the movement of the mobile arm.

6. The coaxial cooling/heating coil structure of claim 1, wherein the cooling channel is formed in a spiral shape.

7. The coaxial cooling/heating coil structure of claim 6, wherein the cooling channel is formed in a shape selecting from the group consisting of: a spiral wrapping around a concave cone and a spiral wrapping around a convex cone.

8. The coaxial cooling/heating coil structure of claim 1, wherein the cooling channel is disposed zigzagging on a two-dimensional plane.

9. The coaxial cooling/heating coil structure of claim 1, wherein the cooling channel is disposed in a three-dimensional space in a manner that different portions of the cooling channel are extending in the space at different heights.

10. The coaxial cooling/heating coil structure of claim 1, wherein the heat-conducting coil is wrapped inside an insulating layer.

11. The coaxial cooling/heating coil structure of claim 1, wherein the heat-conducting coil is a hollow tube with an internal cooling channel formed therein.

12. A mold configured with a coaxial cooling/heating coil structure, comprising:
    a female die;
    a male die; and
    the coaxial cooling/heating coil structure, further comprising:
       a frame;
       a cooling channel, arranged at the frame and configured with an inlet, provided for a cooling water to flow therein, and an outlet, provided for discharging the cooling water therefrom; and
       a heat-conducting coil, disposed inside the cooling channel.

13. The mold of claim 12, further comprising:
    a supporting structure, disposed inside the cooling channel for supporting the heat-conducting coil so that the heat-conducting coil is hung inside the cooling channel without causing any contact between the cooling channel and the heat-conducting coil.

14. The mold of claim 13, wherein the supporting structure is composed of at least one supporting arm, extending from the inner wall of the cooling channel and configured with a hook for clasping the heat-conducting coil in a manner that the heat-conducting coil is hung inside the cooling channel without causing any contact between the cooling channel and the heat-conducting coil.

15. The mold of claim 13, wherein the supporting structure is composed of at least one bracket, disposed at the bottom of the cooling channel to be provided for the heat-conducting coil to mount thereon so that the heat-conducting coil is hung inside the cooling channel without causing any contact between the cooling channel and the heat-conducting coil.

16. The mold of claim 12, wherein the frame is mounted on a mobile arm for enabling the same to be moved along with the movement of the mobile arm.

17. The mold of claim 12, wherein the cooling channel is formed in the shape of a spiral.

18. The mold of claim 17, wherein the cooling channel is formed in a shape selecting from the group consisting of: a spiral wrapping around a concave cone and a spiral wrapping around a convex cone.

19. The mold of claim 12, wherein the cooling channel is disposed zigzagging on a two-dimensional plane.

20. The mold of claim 12, wherein the cooling channel is disposed in a three-dimensional space so that different portions of the cooling channel are extending in the space at different heights.

21. The mold of claim 12, wherein the heat-conducting coil is wrapped inside an insulating layer.

22. The mold of claim 12, wherein the heat-conducting coil is a hollow tube with an internal cooling channel formed therein.

23. The mold of claim 12, wherein the coaxial cooling/heating coil structure is arranged inside the male die.

24. The mold of claim 23, wherein the male die is configured with an insert and the insert is formed with at least one mold cavity, and the coaxial cooling/heating coil structure is disposed at a position corresponding to the at least one mold cavity.

25. The mold of claim 23, wherein the frame is integrally formed with the insert.

26. The mold of claim 23, wherein there is a heat-insulating layer disposed between the male die and the coaxial cooling/heating coil structure.

27. The mold of claim 12, further comprises:
a sub-die, being disposed in the mold while allowing two coaxial cooling/heating coil structures that are structured the same as the aforesaid coaxial cooling/heating coil structure to be arranged respectively at positions between the male die and the sub-die, and between a female die and the sub-die.

* * * * *